US012558679B1

(12) United States Patent
Omran et al.

(10) Patent No.: US 12,558,679 B1
(45) Date of Patent: Feb. 24, 2026

(54) POROUS CALCIUM META VANADATE/CALCIUM SILICATE/GRAPHITIC CARBON NITRIDE (CAV2O6/CASIO3/G-C3N4) NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/232,476

(22) Filed: Jun. 9, 2025

(51) Int. Cl.
| | |
|---|---|
| *B01J 35/39* | (2024.01) |
| *B01J 23/02* | (2006.01) |
| *B01J 23/22* | (2006.01) |
| *B01J 27/24* | (2006.01) |
| *B01J 35/45* | (2024.01) |
| *B01J 35/61* | (2024.01) |
| *B01J 35/63* | (2024.01) |
| *B01J 35/64* | (2024.01) |
| *B01J 37/03* | (2006.01) |
| *B01J 37/04* | (2006.01) |
| *B01J 37/08* | (2006.01) |
| *B01J 37/34* | (2006.01) |

(52) U.S. Cl.
CPC ............... *B01J 35/39* (2024.01); *B01J 23/02* (2013.01); *B01J 23/22* (2013.01); *B01J 27/24* (2013.01); *B01J 35/45* (2024.01); *B01J 35/613* (2024.01); *B01J 35/633* (2024.01); *B01J 35/647* (2024.01); *B01J 37/03* (2013.01); *B01J 37/04* (2013.01); *B01J 37/088* (2013.01); *B01J 37/346* (2013.01)

(58) Field of Classification Search
None
See application file for complete search history.

(56) References Cited

FOREIGN PATENT DOCUMENTS

| | | |
|---|---|---|
| CN | 110182773 A | 8/2019 |
| CN | 111661891 A | 9/2020 |

(Continued)

OTHER PUBLICATIONS

CN-115403344-A- English translation (Year: 2022).*

*Primary Examiner* — Stefanie J Cohen

(74) *Attorney, Agent, or Firm* — Oblon, McClelland, Maier & Neustadt, L.L.P.

(57) ABSTRACT

A porous $CaV_2O_6/CaSiO_3/g\text{-}C_3N_4$ nanocomposite includes a calcium metavanadate ($CaV_2O_6$), a calcium silicate ($CaSiO_3$) and a graphitic carbon nitride ($g\text{-}C_3N_4$) where the $CaV_2O_6$, the $CaSiO_3$ and the $g\text{-}C_3N_4$ are present in a mass ratio of 0.8-1.2:0.8-1.2:0.8-1.2. The $CaV_2O_6$ and $CaSiO_3$ present in the nanocomposite forms a structure of homogeneous nanowire and the $g\text{-}C_3N_4$ forms a structure of a nanosheets where the nanowires are homogeneously distributed between the nanosheets. A method to synthesize the nanocomposite.

20 Claims, 4 Drawing Sheets

(56)    References Cited

FOREIGN PATENT DOCUMENTS

| CN | 111668031 | A |   | 9/2020 |   |             |
|----|-----------|---|---|--------|---|-------------|
| CN | 115020723 | A |   | 9/2022 |   |             |
| CN | 115403344 | A | * | 11/2022 | ......... | C04B 40/0236 |

* cited by examiner

1

POROUS CALCIUM META VANADATE/CALCIUM SILICATE/GRAPHITIC CARBON NITRIDE (CAV2O6/CASIO3/G-C3N4) NANOCOMPOSITE

BACKGROUND

Technical Field

The present disclosure is directed to a $CaV_2O_6/CaSiO_3/$ g-$C_3N_4$ nanocomposite, more particularly, calcium metavanadate ($CaV_2O_6$), calcium silicate ($CaSiO_3$), and graphitic carbon nitride (g-$C_3N_4$)-based nanocomposite material synthesized via a simple precipitation method, a method of synthesizing the nanocomposite and a method of using the nanocomposite.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Carbon-based nanomaterials offer numerous advantages in energy storage applications, particularly in supercapacitors. Their high surface area provides an expanded active area for electrochemical reactions, enhancing their interaction with electrolytes (Ibrahim, T. G., et al., *Eliminating Manifold Pharmaceutical Pollutants with Carbon Nanoparticles Driven via a Short-Duration Ball-Milling Process. Surfaces*, 2024. 7(3): 493-507). Additionally, their electrical conductivity is important for efficient charge and discharge processes. Carbon nanomaterials also exhibit chemical stability, cost-effectiveness, and environmental sustainability, making them highly appealing for energy storage systems. Incorporating these materials into composites or combining them with other substances, such as metal films or graphene can further improve energy density and rate performance (Khairy, M., et al., *Enhancing the Conductivity and Dielectric Characteristics of Bismuth Oxyiodide via Activated Carbon Doping. Molecules*, 2024. 29(9): 2082).

In recent years, graphitic carbon nitride (g-$C_3N_4$) has emerged as a promising alternative to activated carbon for supercapacitor applications. Its photocatalytic properties, especially under visible light, offer a sustainable way to store charge, making it a renewable energy source (Zhang, Y.; et al. *Porous graphitic carbon nitride synthesized via direct polymerization of urea for efficient sunlight-driven photocatalytic hydrogen production. Nanoscale* 2012. 4(17): 5300-5303). g-$C_3N_4$'s lower bandgap allows for a broader absorption of light wavelengths, which enhances energy conversion efficiency. Furthermore, its structure can be engineered through carbon-defect and two-dimensional modifications to improve porosity, surface area, and electrochemical performance.

Research has shown that the form and synthesis conditions of g-$C_3N_4$ significantly influence its photocatalytic efficacy. For example, exfoliating bulk g-$C_3N_4$ into nanosheets via thermal oxidative etching can enhance its activity, with etching time playing a critical role in its surface chemistry and microstructure (Niu, P.; et al. *Graphene-like carbon nitride nanosheets for improved photocatalytic activities. Advanced Functional Materials*. 2012. 22(22): 4763-4770; Ren, J.; et al. *Thermal oxidative etching method derived graphitic $C_3N_4$: Highly efficient metal-free catalyst in the selective epoxidation of styrene. RSC Advances*. 2017. 7(9): 5340-5348; Su, Q.; et al. *Urea-derived graphitic carbon nitride as an efficient heterogeneous atalyst for $CO_2$ conversion into cyclic carbonates. Catalysis Science & Technology* 2014. 4(6): 1556-1562; and Dong, H.; et al. *Synthesis of g-$C_3N_4$ by different precursors under burning explosion effect and its photocatalytic degradation for tylosin. Applied Catalysis B: Environmental* 2018. 230:65-76). Additionally, the precursor used in g-$C_3N_4$ synthesis can affect its photocatalytic properties (Heiligtag F. J.; Niederberger M. *The fascinating world of nanoparticle research. Materials Today*. 2013. 16(7-8): 262-271).

The development of composite materials, which combine materials with distinct physical and chemical properties, has also gained attention. These composites harness the unique interactions between components to create materials with enhanced performance characteristics, particularly useful in energy storage applications.

Each of the aforementioned conventional methods suffers from one or more drawbacks hindering their widespread adoption, including high operational costs, complex maintenance, limited efficiency at low ion concentrations, and secondary pollution. Accordingly, it is one object of the present disclosure to provide methods and systems to overcome these limitations by offering high photocatalytic activity, cost-efficiency, and environmental sustainability.

SUMMARY

In an exemplary embodiment, a porous $CaV_2O_6/CaSiO_3/$ g-$C_3N_4$ nanocomposite is described. The nanocomposite includes a calcium metavanadate ($CaV_2O_6$), a calcium silicate ($CaSiO_3$), and a graphitic carbon nitride (g-$C_3N_4$) where the $CaV_2O_6$, the $CaSiO_3$, and the g-$C_3N_4$ are present in a mass ratio of 0.8-1.2:0.8-1.2:0.8-1.2. The $CaV_2O_6$ and $CaSiO_3$ form a structure of homogeneous nanowires, and the g-$C_3N_4$ forms a structure of a nanosheet where the nanowires are homogeneously distributed between the nanosheets.

In some embodiments, the g-$C_3N_4$ nanosheets have an interplanar spacing of 0.1-0.25 nanometer (nm).

In some embodiments, the $CaV_2O_6/CaSiO_3$ nanowires have an average length of 80-100 nm.

In some embodiments, the nanocomposite has a Brunauer-Emmett-Teller (BET) surface area of 50-65 square meters per gram ($m^2g^{-1}$).

In some embodiments, the nanocomposite has an average pore diameter of 2-20 nm.

In some embodiments, the nanocomposite has an average pore volume of 0.1-0.3 cubic centimeters per gram ($cm^3g^{-1}$).

In some embodiments, the nanocomposite has a pore size distribution of 0.001-0.02 cubic centimeters per gram per nanometer ($cm^3g^{-1}$ $nm^{-1}$).

In another exemplary embodiment, a method to synthesize the $CaV_2O_6/CaSiO_3/g$-$C_3N_4$ nanocomposite is described. The method includes heating a calcium salt and a silicate salt in an alcohol and water solution to form a silicate product. Further, the method includes heating urea to a temperature of 550-650 degrees Celsius (° C.) for 30-60 minutes (min) to form a g-$C_3N_4$ product. The method further includes heating a vanadium compound and a biomass with water and an acid to form a vanadium product. Further, the method includes mixing the silicate product, the g-$C_3N_4$ product, and the vanadium product in an ethylene glycol monomethyl ether to form a mixture and then microwaving the mixture to form the nanocomposite.

In some embodiments, the calcium salt is at least one selected from the group consisting of calcium nitrate (Ca$(NO_3)_2$), calcium phosphate ($Ca_3(PO_4)_2$), calcium sulfate ($CaSO_4$), calcium chloride ($CaCl_2$)), calcium acetate (Ca$(CH_3COO)_2$), and calcium carbonate ($CaCO_3$).

In some embodiments, the silicate salt is at least one selected from the group consisting of sodium metasilicate ($Na_2SiO_3$), potassium metasilicate ($K_2SiO_3$) and magnesium metasilicate ($MgSiO_3$).

In some embodiments, the alcohol is at least one selected from the group consisting of methanol, ethanol, propanol and butanol.

In some embodiments, the vanadium compound is at least one selected from the group consisting of ammonium metavanadate ($NH_4VO_3$), sodium metavanadate ($NaVO_3$), silver metavanadate ($AgVO_3$), manganese metavanadate ($MnVO_3$), vanadium (II) oxide (VO), vanadium (III) oxide ($V_2O_3$), vanadium (IV) oxide ($VO_2$) and vanadium (V) oxide ($V_2O_5$).

In some embodiments, the biomass is at least one selected from the group consisting of xylose, glucose, fructose, galactose, arabinose, ribose, lyxose, cellulose, hemicellulose and lignin.

In some embodiments, the acid is at least one selected from the group consisting of nitric acid, hydrochloric acid, sulfuric acid, acetic acid, and phosphoric acid.

In some embodiments, the silicate product is heated to a temperature of 160-200° C. for 1-3 hours (h).

In some embodiments, the vanadium product is heated to a temperature of 110-130° C. for 4-6 h.

In some embodiments, the mixture is microwaved at a temperature of 160-200° C. at a pressure of 4-6 bar for 30 to 90 min.

In some embodiments, the vanadium product may be calcinated at a temperature of 500-600° C. for 2 to 4 h before mixing.

In some embodiments, the nanocomposite has a slit-shaped pore.

In some embodiments, the nanocomposite has an average pore diameter maximized at 4.3, 8.5, and 14.27 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
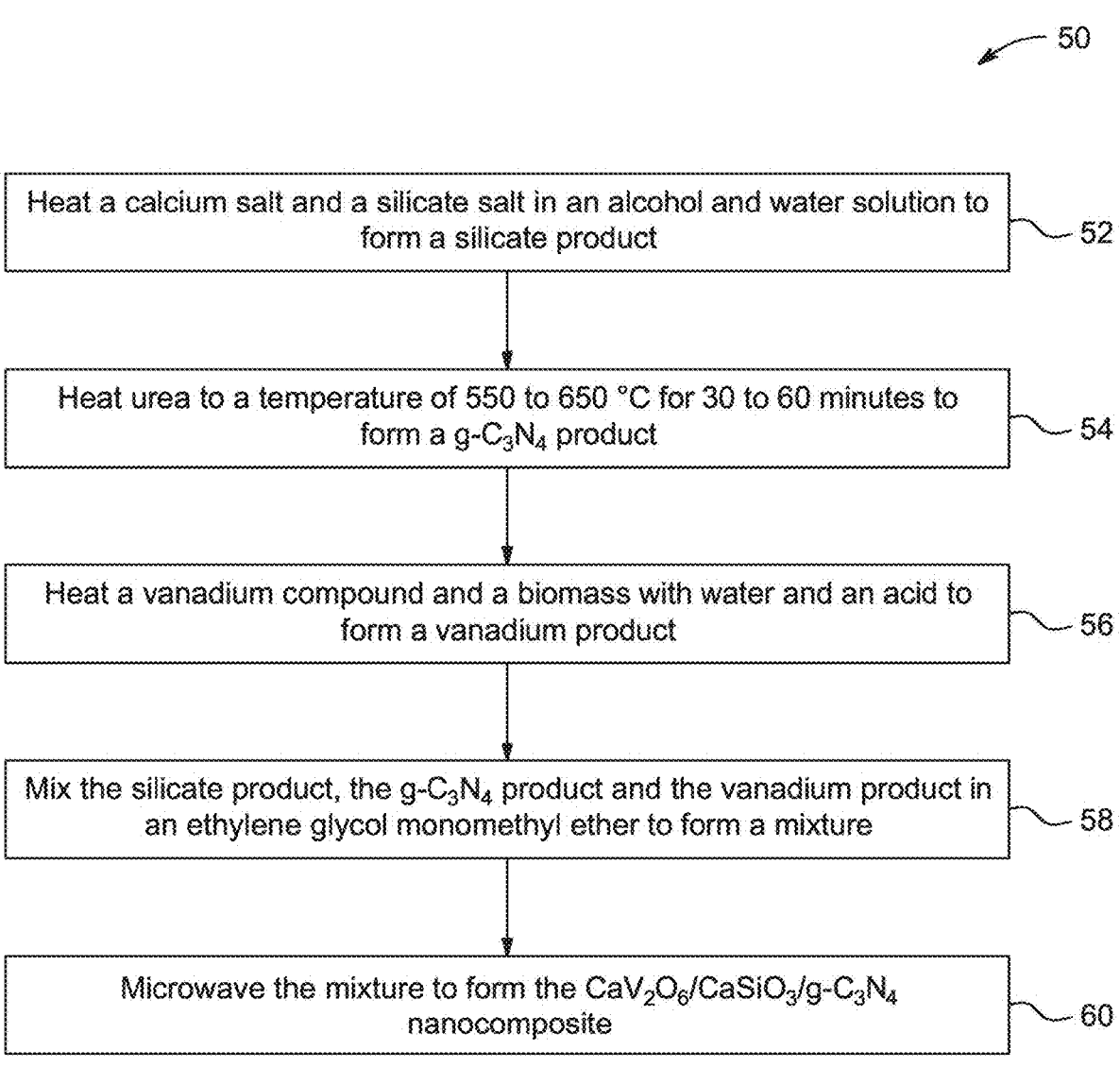
FIG. 1 illustrates an exemplary flow chart for a method of preparation of a $CaV_2O_6/CaSiO_3/g$-$C_3N_4$ nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "nanoparticles (NPs)" refers to particles having a particle size of 1 nm to 500 nanometer (nm) within the scope of the present invention. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nano-whiskers, nanoflakes, nanofoils, nanopowders, nanoboxes, nanostars, tetrapods, nanobelts, nano-urchins, nanoflowers, etc., and mixtures thereof.

As used herein, the term "nanocomposites" refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "nano-heterostructures" refers to nanoscale materials composed of two or more distinct components or phases with different compositions, structures, or properties, joined together at the nanometer scale to form a single integrated structure.

As used herein, the term g-$C_3N_4$ nanosheets refers to thin, two-dimensional sheets of graphitic carbon nitride (g-$C_3N_4$), a material composed of carbon, nitrogen, and hydrogen atoms arranged in a graphitic-like structure. These nanosheets are typically several nanometers thick and possess high surface area and unique electronic properties, making them suitable for various applications, including photocatalysis, energy storage, and sensing. The nanosheets can enhance the material's photocatalytic efficiency by providing more active sites for reactions and improving the separation of charge carriers under visible light irradiation.

The present application relates to "multiple", "several", and the like, if not specifically limited, to a number greater than 2 or equal to 2. For example, one or more' means one or more than two.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5 degrees Celsius (C), 4° C., 3° C., 2° C. and 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically labeled compounds of the disclosure may generally be prepared by conventional techniques known to those skilled in the art or by processes analogous to those described herein, using an appropriate isotopically labeled reagent in place of the non-labeled reagent otherwise employed.

As used herein, the term "organic contaminants" refers to carbon-based compounds, typically derived from industrial, agricultural, or domestic activities, that are present as contaminants in water or the environment. These contaminants may include pesticides, pharmaceuticals, dyes and other synthetic or natural organic substances that can pose environmental or health risks.

As used herein, the term "photocatalysis" refers to a process in which a photocatalyst absorbs UV (ultraviolet) or visible light and, upon activation, accelerates a chemical reaction without being consumed in the process. This reaction typically involves the degradation or transformation of pollutants, organic compounds, or harmful substances in the presence of light. Photocatalysis is widely used in environmental applications, such as water purification, air cleaning, and solar energy conversion, as the photocatalyst facilitates the breakdown of contaminants into harmless byproducts, often producing environmentally friendly results.

As used herein the term "XRD" refers to X-ray diffraction, a scientific technique used to study the structure of materials. It is commonly used to identify the crystalline phases of a substance, crystal structure and to analyze the arrangement of atoms within a material.

As used herein, the term "BET" refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term "surface area" refers to the total area of the surface of a material that is available for interaction with its environment. It is a measure of the extent of a material's surface exposed to external conditions, which can be important in determining the material's reactivity, adsorption capacity, or other surface-related properties.

As used herein, the term "porosity" refers to a measure of the void or vacant spaces within a material.

As used herein, the term "pore diameter" refers to an average width or size of the pores (void spaces) within a material, typically measured in nm or angstroms (Å). It is a key parameter in characterizing the texture and permeability of porous materials, influencing their adsorption, filtration, or catalytic properties.

As used herein, the term "pore volume" refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein the term "Barrett-Joyner-Halenda (BJH)" method is a method used to analyze pore size distribution in porous materials, typically from nitrogen adsorption-desorption isotherms. The BJH method is especially useful for characterizing mesoporous materials (with pore sizes between 2 and 50 nm).

As used herein, the term "mesoporous" refers to a type of material that contains pores (voids or spaces) with diameters typically ranging from 2 to 50 nm. These pores are intermediate in size between micropores (less than 2 nm) and macropores (greater than 50 nm).

As used herein, the term "Transmission electron microscopy (TEM)" refers to a microscopy technique that utilizes a beam of electrons transmitted through a thin sample to form an image. TEM provides high-resolution imaging at the nanometer or even atomic scale, allowing the observation of the internal structure of materials. This method is widely used to examine the morphology, crystallography, and composition of nanoparticles, materials, and biological specimens, offering detailed insights into their microstructure.

As used herein, the term "spinel interplanar spacing" refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is for understanding the material's structural properties and is typically measured using X-ray diffraction (XRD) techniques.

Aspects of the present disclosure are directed to a porous nanocomposite of calcium metavanadate ($CaV_2O_6$), calcium silicate ($CaSiO_3$), and graphitic carbon nitride ($g-C_3N_4$)-based nanocomposite material synthesized via a simple precipitation method. The nanocomposite material fabricated by the method of the present disclosure achieves a multi-phase crystalline structure with controlled morphology and enhanced structural properties.

A porous $CaV_2O_6/CaSiO_3/g-C_3N_4$ nanocomposite includes a calcium metavanadate ($CaV_2O_6$), a calcium silicate ($CaSiO_3$), and a graphitic carbon nitride ($g-C_3N_4$), where the $CaV_2O_6$, the $CaSiO_3$, and the $g-C_3N_4$ are present in a mass ratio of 0.8-1.2:0.8-1.2:0.8-1.2. In some embodiments, the mass ratio of $CaV_2O_6$, $CaSiO_3$, and $g-C_3N_4$ is in the range of 0.8-1.2:0.8-1.2:0.8-1.2 and preferably 0.9-1.1:0.9-1.1:0.9-1.1. In a preferred embodiment, the mass ratio of $CaV_2O_6:CaSiO_3:g-C_3N_4$ is 1:1:1.

In some embodiments, the $CaV_2O_6$ and the $CaSiO_3$ may be in forms of nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nanourchins, nanoflowers, or a combination thereof. In a preferred embodiment, the $CaV_2O_6$ and the $CaSiO_3$ may be in forms of nanowires, whereby the $CaV_2O_6/CaSiO_3$ nanowire may have an average length of 80-100 nm, preferably 81-99 nm, preferably 82-98 nm, preferably 83-97 nm, preferably 84-96 nm, preferably 85-95 nm, preferably 86-94 nm, preferably 87-93 nm, preferably 88-92 nm and preferably 89-91 nm. In a preferred embodiment, the $CaV_2O_6$ and $CaSiO_3$ form a structure of homogeneous nanowires with an average length of 90.6 nm.

In some embodiments, the $g$-$C_3N_4$ present in the nanocomposite may be in form of nanorods, nanotubes, nanowires, nanocubes, nanosheets, nanoplates and nanoflowers, more preferably in the form of nanosheets, whereby the $g$-$C_3N_4$ nanosheet may have an interplanar spacing of 0.1-0.25 nm, preferably 0.11-0.24 nm, preferably 0.12-0.23 nm, preferably 0.13-0.22 nm, preferably 0.14-0.21 nm, preferably 0.15-0.20 nm, preferably 0.16-0.19 nm, preferably 0.17-0.18 nm. In a preferred embodiment, the $g$-$C_3N_4$ forms a structure of a nanosheet, and the nanowires are distributed between the nanosheets homogeneously.

In some embodiments, the nanocomposite is porous. A porous material is the one that forms a porous bulk solid. Pores may be micropores, mesopores, macropores, and/or a combination thereof. The pores exist in the bulk material, not necessarily in the molecular structure of the material. The term "microporous" means that nanocomposite have pores with an average pore width (i.e. diameter) of less than 2 nm. The term 'mesoporous' means the pores of the nanocomposite have an average pore width of 2-50 nm. The term "microporous" means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In a preferred embodiment, the nanocomposite has a mesoporous structure with a plurality of wide pores in the $g$-$C_3N_4$ nanosheets where the metal oxides nanorods deposit.

In some embodiments, the nanocomposite has a Brunauer-Emmett-Teller (BET) surface area of 50-65 square meters per gram ($m^2g^{-1}$), preferably 50.2-64.8 $m^2g^{-1}$, preferably 50.4-64.7 $m^2g^{-1}$, preferably 50.6-64.6 $m^2g^{-1}$, preferably 50.8-64.5 $m^2g^{-1}$, preferably 51-64.4 $m^2g^{-1}$, preferably 51.2-64.3 $m^2g^{-1}$, preferably 51.4-64.2 $m^2g^{-1}$, preferably 51.6-64.1 $m^2g^{-1}$, preferably 51.8-64.0 $m^2g^{-1}$, preferably 52-63.9 $m^2g^{-1}$, preferably 52.2-63.8 $m^2g^{-1}$, preferably 52.4-63.7 $m^2g^{-1}$, preferably 52.6-63.6 $m^2g^{-1}$, preferably 52.8-63.5 $m^2g^{-1}$, preferably 53-63.4 $m^2g^{-1}$, preferably 53.2-63.3 $m^2g^{-1}$, preferably 53.4-63.2 $m^2g^{-1}$, preferably 53.6-63.1 $m^2g^{-1}$, preferably 53.8-63 $m^2g^{-1}$, preferably 54-62.9 $m^2g^{-1}$, preferably 54.2-62.8 $m^2g^{-1}$, preferably 54.4-62.7 $m^2g^{-1}$, preferably 54.6-62.6 $m^2g^{-1}$, preferably 54.8-62.5 $m^2g^{-1}$, preferably 55-62.4 $m^2g^{-1}$, preferably 55.2-62.3 $m^2g^{-1}$, preferably 55.4-62.2 $m^2g^{-1}$, preferably 55.6-62.1 $m^2g^{-1}$, preferably 55.8-62 $m^2g^{-1}$, preferably 56-61.9 $m^2g^{-1}$, preferably 56.2-61.8 $m^2g^{-1}$, preferably 56.4-61.7 $m^2g^{-1}$, preferably 56.6-61.6 $m^2g^{-1}$, preferably 56.8-

61.5 $m^2g^{-1}$, preferably 57-61.4 $m^2g^{-1}$. In a preferred embodiment, the surface area of the nanocomposite is 57.02 $m^2g^{-1}$.

The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanocomposite may include, but is not limited to, crystalline average pore distribution, bimodal, trimodal, multimodal, narrow, broad, and Gaussian. In some embodiments, the nanocomposite has a slit-shaped pore. In a preferred embodiment, the average pore distribution of the nanocomposite is trimodal, indicating the presence of three distinct pore size ranges within the nanocomposite, which may enhance the performance of the material by facilitating improved molecular transport, selective permeability, or optimized surface area for catalytic or adsorption processes.

In some embodiments, the nanocomposite has an average pore diameter of 2-20 nm. In a preferred embodiment, the nanocomposite exhibits three pore diameters in different ranges first in range a of 2-10 nm, preferably 2.1-9.9 nm, preferably 2.2-9.8 nm, preferably 2.3-9.7 nm, preferably 2.4-9.6 nm, preferably 2.5-9.5 nm, preferably 2.6-9.4 nm, preferably 2.7-9.0 nm, preferably 2.8-8.8 nm, preferably 2.9-8.6 nm, preferably 3.0-8.4 nm, preferably 3.1-8.2 nm, preferably 3.2-8.0 nm, preferably 3.3-7.8 nm, preferably 3.4-7.6 nm, preferably 3.5-7.4 nm, preferably 3.6-7.2 nm, preferably 3.7-7.0 nm, preferably 3.8-6.8 nm, preferably 3.9-6.4 nm preferably 4.0-6.0 nm, preferably 4.1-5.8 nm, preferably 4.2-5.4 nm; second in a range of 5-10 nm, preferably 5.1-9.9 nm, preferably 5.2-9.8 nm, preferably 5.4-9.7 nm, preferably 5.6-9.6 nm, preferably 5.8-9.5 nm, preferably 6.0-9.4 nm, preferably 6.1-9.3 nm, preferably 6.2-9.2 nm, preferably 6.4-9.1 nm, preferably 6.6-9.0 nm, preferably 6.8-8.9 nm, preferably 7.0-8.8 nm preferably 7.2-8.7 nm preferably 7.4-8.6 nm and third in a range of 10-20 nm, preferably 10.1-19.8 nm, preferably 10.2-19.7 nm, preferably 10.3-19.6 nm, preferably 10.4-19.4 nm, preferably 10.5-19.2 nm, preferably 10.6-19.0 nm, preferably 10.7-18.8 nm, preferably 10.8-18.6 nm, preferably 10.9-18.4 nm, preferably 11-18.2 nm, preferably 11.1-18.0 nm, preferably 11.2-17.8 nm, preferably 11.4-17.6 nm, preferably 11.6-17.4 nm, preferably 11.8-17.2 nm, preferably 12-17.0 nm, preferably 12.2-16.8 nm, preferably 12.4-16.6 nm, preferably 12.6-16.4 nm, preferably 12.8-16.2 nm, preferably 13-16.0 nm, preferably 13.2-15.8 nm, preferably 13.4-15.6 nm, preferably 13.6-15.4 nm, preferably 13.8-15.2 nm, preferably 14-15 nm. In a preferred embodiment the average pore diameters of the nanocomposite are maximized at 4.3 nm, 8.5 nm and 14.27 nm.

In some embodiments, the nanocomposite has an average pore volume of 0.1-0.3 cubic centimeters per gram ($cm^3g^{-1}$), preferably 0.12-0.29 $cm^3g^{-1}$, preferably 0.14-0.28 $cm^3g^{-1}$, preferably 0.15-0.27 $cm^3g^{-1}$, preferably 0.16-0.26 $cm^3g^{-1}$, preferably 0.17-0.25 $cm^3g^{-1}$, preferably 0.18-0.24 $cm^3g^{-1}$ and preferably 0.20-0.23 $cm^3g^{-1}$. In some embodiments the nanocomposite has a pore size distribution of 0.001-0.02 cubic centimeters per gram per nanometer ($cm^3g^{-1}\,nm^{-1}$), preferably 0.002-0.019 $cm^3g^{-1}\,nm^{-1}$, preferably 0.003-0.018 $cm^3g^{-1}\,nm^{-1}$, preferably 0.004-0.017 $cm^3g^{-1}\,nm^{-1}$, preferably 0.004-0.016 $cm^3g^{-1}$ $nm^{-1}$, preferably 0.005-0.015 $cm^3g^{-1}$ $nm^{-1}$, preferably 0.006-0.014 $cm^3g^{-1}$ $nm^{-1}$, preferably 0.007-0.013 $cm^3g^{-1}$ $nm^{-1}$, preferably 0.008-0.012 $cm^3g^{-1}$ $nm^{-1}$ and preferably 0.009-0.011 $cm^3g^{-1}$ $nm^{-1}$. In a preferred embodiment, the average pore volume of the nanocomposite is 0.22 $cm^3g^{-1}$.

FIG. 1 illustrates a schematic flow chart of a method 50 of preparing a $CaV_2O_6/CaSiO_3/g$-$C_3N_4$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes heating a calcium salt and a silicate salt in an alcohol and water solution to form a silicate product. In some embodiments, the calcium salt is at least one selected from the group consisting of calcium nitrate ($Ca(NO_3)_2$), calcium phosphate ($Ca_3(PO_4)_2$), calcium sulfate ($CaSO_4$), calcium chloride ($CaCl_2$)), calcium acetate ($Ca(CH_3COO)_2$) and calcium carbonate ($CaCO_3$). In a preferred embodiment, the calcium salt is $Ca(NO_3)_2$.

In some embodiments, the silicate salt is at least one selected from potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In some embodiments, the silicate salt is at least one of sodium metasilicate ($Na_2SiO_3$), potassium metasilicate ($K_2SiO_3$), and magnesium metasilicate ($MgSiO_3$). In a preferred embodiment, the silicate salt is $Na_2SiO_3$.

In some embodiments, the alcohol is at least one selected from methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In some embodiments, the alcohol is selected from methanol, ethanol, propanol, and butanol. In a preferred embodiment, equal moles of $Ca(NO_3)_2$ and $Na_2SiO_3$ were dispersed in ethanol:water (1:1). Water may be tap water, distilled water, double-distilled water, deionized water, deionized distilled water, reverse osmosis water, and/or some other water.

In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

In some embodiments, the silicate product is heated to a temperature of 160-200° C., preferably 165-199° C., preferably 167-198° C., preferably 168-197° C., preferably 169-196° C., preferably 170-195° C., preferably 171-194° C., preferably 172-193° C., preferably 173-192° C., preferably 174-191° C., preferably 175-190° C., preferably 176-188° C., preferably 177-187° C., preferably 178-186° C., preferably 179-185° C., for 1-3 hours (h), preferably 1.5-2.5 h. In a preferred embodiment, the silicate product is transferred in an autoclave and the mixture is heated in an oven operated at 180° C. for 2 h.

At step 54, the method 50 includes heating urea to a temperature of 550-650° C. for 30-60 minutes (min) to form a g-$C_3N_4$ product. In an alternate embodiment, other nitrogen-containing precursors, apart from urea, such as melamine, dicyandiamide, ammonium thiocyanate, or ammonium carbonate, may also be used. These alternatives provide nitrogen necessary for the formation of carbon nitride structures. Typically, these precursors are used in amounts of approximately 5 wt. % relative to the total weight of the nanocomposite to achieve the desired nitrogen content for the desired structural properties.

In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

In some embodiments, g-$C_3N_4$ is formed by heating urea to a temperature of 550-650° C., preferably 555-645° C., preferably 560-640° C., preferably 565-635° C., preferably 570-630° C., preferably 575-625° C., preferably 580-620° C., preferably 585-615° C., preferably 590-610° C., preferably 595-605° C. for 30-60 min, preferably 31-59 min, preferably 32-58 min, preferably 33-57 min, preferably 34-56 min, preferably 35-55 min, preferably 36-54 min, preferably 37-53 min, preferably 38-52 min, preferably 39-51 min, preferably 40-50 min, preferably 41-49 min, preferably 42-48 min, preferably 43-47 min, preferably 44-46 min. In a preferred embodiment, the urea is heated at 600° C. for 45 min.

At step 56, the method 50 includes heating a vanadium compound and a biomass with water and an acid to form a vanadium product. In some embodiments, the vanadium compound is at least one selected from the group consisting of ammonium metavanadate ($NH_4VO_3$), sodium metavanadate ($NaVO_3$), silver metavanadate ($AgVO_3$), manganese metavanadate ($MnVO_3$), vanadium (II) oxide (VO), vanadium (III) oxide ($V_2O_3$), vanadium (IV) oxide ($VO_2$) and vanadium (V) oxide ($V_2O_5$). In a preferred embodiment, the vanadium salt is $NH_4VO_3$.

In some embodiments, the biomass is at least one selected from the group consisting of xylose, glucose, fructose, galactose, arabinose, ribose, lyxose, cellulose, hemicellulose, and lignin. In a preferred embodiment, the biomass selected is xylose.

In some embodiments, the acid is at least one selected from the group consisting of nitric acid, hydrochloric acid, sulfuric acid, acetic acid, and phosphoric acid. In a preferred embodiment, the acid used is concentrated nitric acid.

In some embodiments, the method includes heating the vanadium product to a temperature of 110-130° C., preferably 112-128° C., preferably 113-127° C., preferably 114-126° C., preferably 115-125° C., preferably 116-124° C., preferably 117-123° C., preferably 118-122° C., preferably 119-121° C., for 4-6 h, preferably 4.5-5.5 h. In a preferred embodiment, the vanadium product is heated at 120° C. for 5 h.

In some embodiments, the vanadium product may be calcinated at a temperature of 500-600° C. for 2-4 h before mixing. The calcination of the precipitate is carried out by heating it to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10°

C./min, preferably up to 5° C./min, preferably up to 2° C./min, and preferably up to 1° C./min.

In some embodiments, the vanadium product may be calcinated at a temperature of 500-600° C., preferably 505-595° C., preferably 510-590° C., preferably 515-585° C., preferably 520-580° C., preferably 525-575° C., preferably 530-570° C., preferably 535-565° C., preferably 540-560° C., preferably 545-555° C., for 2-4 h, preferably 2.5-3.5 h before mixing. In a preferred embodiment, the vanadium product is calcined at 550° C. for 3 h.

At step 58, the method 50 includes mixing the silicate product, the g-C₃N₄ product, and the vanadium product in an ethylene glycol monomethyl ether to form a mixture. In some embodiments, other polyols part from ethylene glycol monomethyl ether may also be used. In some embodiments, the polyol is selected from the group consisting of: polyester polyols; polyether polyols; poly(ether-ester) polyols; poly (alkylene carbonate) polyols; and, mixtures thereof.

In some embodiments, the polyester polyols preferably include poly(ethylene glycol), poly(propylene glycol) and poly(tetrahydrofuran). The polyester polyols also include conventional polyester polyols, polycaprolactone polyols and polycarbonate diols, which contain ester groups or carbonate groups, and generally referred polyester polyols obtained by polycondensation of dicarboxylic acids with glycols and the like. The polyester polyols also include bio-based and eco-friendly polyester polyols.

In some embodiments, the polyether polyols preferably include Polyether Polyol (PPG), Polymeric Polyol (POP), Polytetramethylene ether glycol (PTMEG), specialty PPG polyols such as SAN grafted polyether polyol, EG "tipped" PPG polyols, poly(tetramethylene) glycol (PTMO), poly (propylene oxide) (PPO), poly(ethylene) glycol (PEG) or a mixture thereof.

In some embodiments, the polyester polyol includes poly (ether-co-ester) polyol, poly (ether-co-hydrocarbon) polyol, poly (ether-co-siloxane) polyol, poly (ester-co-siloxane) polyol, poly (ether-co-carbonate) polyol, poly (ester-co-carbonate) polyol, poly (ester-co-hydrocarbon) polyol, or mixtures thereof. In some embodiments, polycarbonate polyol include hydrocarbon polyol, polysiloxane polyol, poly(ether-co-ester) polyol, poly(ether-co-carbonate) polyol, poly(ether-co-hydrocarbon) polyol, poly(ether-co-siloxane) polyol, poly(ester-co-carbonate) polyol, poly(ester-co-hydrocarbon) polyol, poly(ester-co-siloxane) polyol, poly(carbonate-co-hydrocarbon) polyol, poly(carbonate-co-siloxane) polyol, poly(hydrocarbon-co-siloxane) polyol, or a mixture thereof.

In some embodiments, the polyester polyol is a poly (ether-ester) polyols preferably polyether ester polyols are understood in accordance with the invention to mean those polyols having a chemical structure including both ether and ester groups. Examples of the polyether polyol include polyoxy (C2 to C3)alkylene polyols and polytetramethylene ether polyols.

In some embodiments, the polyester polyol is a poly (alkylene carbonate) polyols. The poly(alkylene carbonate) polyols included here can be prepared by reacting an oxirane with either carbon dioxide or a cyclic alkylene carbonate, or a mixture thereof in the presence of a suitable initiator. Suitable oxiranes include ethylene oxide, propylene oxide, butylene oxide, styrene oxide, and the like. Most preferred is ethylene oxide due to its relatively facile reaction with carbon dioxide and/or a cyclic alkylene carbonate.

In some embodiments, the polyol includes a polyoxy (C2-C3)alkylene polyol. More specific examples of the polyoxy (C2 to C3) alkylene polyol include polyoxyethylene polyols, polyoxypropylene polyols, and polyoxyethylene·polyoxypropylene (random and/or block) copolymers or any combinations thereof.

In alternate embodiments, the polyol further includes a polyoxy (C2-C3)alkylene polyol having a number average molecular weight of from about 200 to about 5000 g/mol. and an hydroxyl number of from about 25 to about 500 mg KOH/g.

In some embodiments, the polyoxy (C2-C3)alkylene polyol has a number average molecular weight 200 to about 300, preferably 200 to about 400, preferably 200 to about 500, preferably 200 to about 600, preferably 200 to about 700, preferably 200 to about 800, preferably 200 to about 900, preferably 200 to about 1000, preferably 200 to about 1100, preferably 200 to about 1200, preferably 200 to about 1300, 200 to about 1400, preferably 200 to about 1500, preferably 200 to about 1600, preferably 200 to about 1700, preferably 200 to about 1800, preferably 200 to about 1900, preferably 200 to about 2000, preferably 200 to about 2100, preferably 200 to about 2200, preferably 200 to about 2300, preferably 200 to about 2400, preferably 200 to about 2500, preferably 200 to about 2600, preferably 200 to about 2700, preferably 200 to about 2800, preferably 200 to about 2900, preferably 200 to about 3000, preferably 200 to about 3100, preferably 200 to about 3200, preferably 200 to about 3300, preferably 200 to about 3400, preferably 200 to about 3500, preferably 200 to about 3600, preferably 200 to about 3700, preferably 200 to about 3800, preferably 200 to about 3900, preferably 200 to about 4000, preferably 200 to about 4100, preferably 200 to about 4200, preferably 200 to about 4300, preferably 200 to about 4400, preferably 200 to about 4500, preferably 200 to about 4600, preferably 200 to about 4700, preferably 200 to about 4800, preferably 200 to about 4900, preferably 200 to about 4950, and an hydroxyl number preferably from 25 to about 35, preferably from 25 to about 40, preferably from 25 to about 50, preferably from 25 to about 55, preferably from 25 to about 60, preferably from 25 to about 65, preferably from 25 to about 70, preferably from 25 to about 75, preferably from 25 to about 80, preferably from 25 to about 85, preferably from 25 to about 90, preferably from 25 to about 95, preferably from 25 to about 100, preferably from 25 to about 105, preferably from 25 to about 110, preferably 25 to about 115, preferably 25 to about 120, preferably 25 to about 125, preferably 25 to about 130, preferably 25 to about 135, preferably 25 to about 140, preferably 25 to about 145, preferably 25 to about 150, preferably 25 to about 155, preferably 25 to about 160, preferably 25 to about 165, preferably 25 to about 170, preferably 25 to about 175, preferably 25 to about 180, preferably 25 to about 185, preferably 25 to about 190, preferably 25 to about 195, preferably 25 to about 200, preferably from 25 to about 205, preferably from 25 to about 210, preferably 25 to about 215, preferably 25 to about 220, preferably 25 to about 225, preferably 25 to about 230, preferably 25 to about 235, preferably 25 to about 240, preferably 25 to about 245, preferably 25 to about 250, preferably 25 to about 255, preferably 25 to about 260, preferably 25 to about 265, preferably 25 to about 270, preferably 25 to about 275, preferably 25 to about 280, preferably 25 to about 285, preferably 25 to about 290, preferably 25 to about 295, preferably 25 to about 300, preferably from 25 to about 305, preferably from 25 to about 310, preferably 25 to about 315, preferably 25 to about 320, preferably 25 to about 325, preferably 25 to about 330, preferably 25 to about 335, preferably 25 to about 340, preferably 25 to about 345, preferably 25 to about 350, preferably 25 to about 355, preferably 25 to about 360, preferably 25 to about 365, preferably 25 to about 370, preferably 25 to about 375, preferably 25 to about 380, preferably 4 to about 385, preferably 25 to about 390, preferably 25 to about 395, preferably 25 to about 400 preferably from 25 to about 405, preferably from 25 to about 410, preferably 25 to about 415, preferably 25 to about 420, preferably 25 to about 425, preferably 25 to about 430, preferably 25 to about 435, preferably 25 to about 440, preferably 25 to about 445, preferably 25 to about 450, preferably 25 to about 455, preferably 25 to about 460, preferably 25 to about 465, preferably 25 to about 470, preferably 25 to about 475, preferably 25 to about 480, preferably 25 to about 485, preferably 25 to about 490, preferably 25 to about 495 mg KOH/g. In a preferred embodiment, the polyol is mono $(C_1-C_4)$alkyl ethers of ethylene glycol. In a preferred embodiment, the polyol is ethylene glycol monomethyl ether.

At step 60, the method 50 includes microwaving the mixture to form the $CaV_2O_6/CaSiO_3/g-C_3N_4$ nanocomposite. In some embodiments, the mixture is microwaved at a temperature of 160-200° C., preferably 161-199° C., preferably 162-198° C., preferably 163-197° C., preferably 164-196° C., preferably 165-195° C., preferably 166-194° C., preferably 167-193° C., preferably 168-192° C., preferably 169-191° C., preferably 170-190° C., preferably 171-189° C., preferably 172-188° C., preferably 173-186° C., preferably 174-185° C., preferably 175-184° C., preferably 176-183° C., preferably 177-182° C. and preferably 178-181° C. at a pressure of 4 to 6 bar for 30-90 min. In a preferred embodiment, the mixture is microwaved at 180° C. at 5 bar pressure for 30 min.

EXAMPLES

The following examples demonstrate a $CaV_2O_6/CaSiO_3/g-C_3N_4$ nanocomposite and method of preparation thereof. The examples are provided solely for illustration and are not to be construed as limitations of the present disclosure, as many variations thereof are possible without departing from the spirit and scope of the present disclosure.

Example 1: Fabricating a Calcium Silicate (CaSiO₃)

Equal moles of calcium nitrate and sodium metasilicate were dispersed in 100 (milliliters) mL of ethanol:water (1:1) in a 150 mL glass beaker and sonicated for 15 minutes (min). The mixture was transferred to a 200 mL autoclave and then placed in an oven operated at 180 degrees Celsius (° C.) for 2.0 hours (h). The product was dispersed in 500 ml distilled water with an ultrasonic bath for 10 minutes, filtered via a Buchner system, rinsed with distilled water, and dried at 120° C. for 1.0 h.

Example 2: Fabricating a Graphitic Carbon Nitride (g-C₃N₄)

For synthesizing g-C₃N₄ about 30.0 gram (g) of urea was placed in a 250 mL porcelain crucible, covered with its porcelain cover, then the hall crucible and cover were wrapped with three layers of aluminum foil to reduce the urea loss of evaporation. The crucible was heated via a furnace set at 600° C. for 45 min.

Example 3: Fabricating a Vanadium Pentoxide (V₂O₅)

About 10.0 ammonium metavanadate and 10.0 g of xylose were placed in a 500 mL beaker. Further 100 ml distilled water was added to the mixture and heated till a clear solution was obtained. 10 mL of concentrated nitric acid was added to the mixture, which was then heated till the carbonization of xylose. The mixture was placed in an oven set at 120° C. for 5.0 h, the black product was milled in a mortar, placed in a 150 mL porcelain dish, and calcined at 550° C. for 3.0 h.

Example 4: Fabricating a $CaV_2O_6@CaSiO_3@g-C_3N_4$

An equal mass of $CaSiO_3$, g-C₃N₄, and V₂O₅ were transferred to a mono wave-200 vial (G30), dispersed in 20 mL ethylene glycol monomethyl ether via an ultrasonic bath for 30 min. The vial was closed with its teflon cover and placed in the Anton-Baar Monowave-200 operated at 180° C. and 5.0 bar pressure for one hour. The product was dispersed in 1 L distilled water with an ultrasonic bath for 30 minutes, filtered via a Buchner system, rinsed with distilled water, and dried at 150° C. for 2.0 h.

Figure 2:
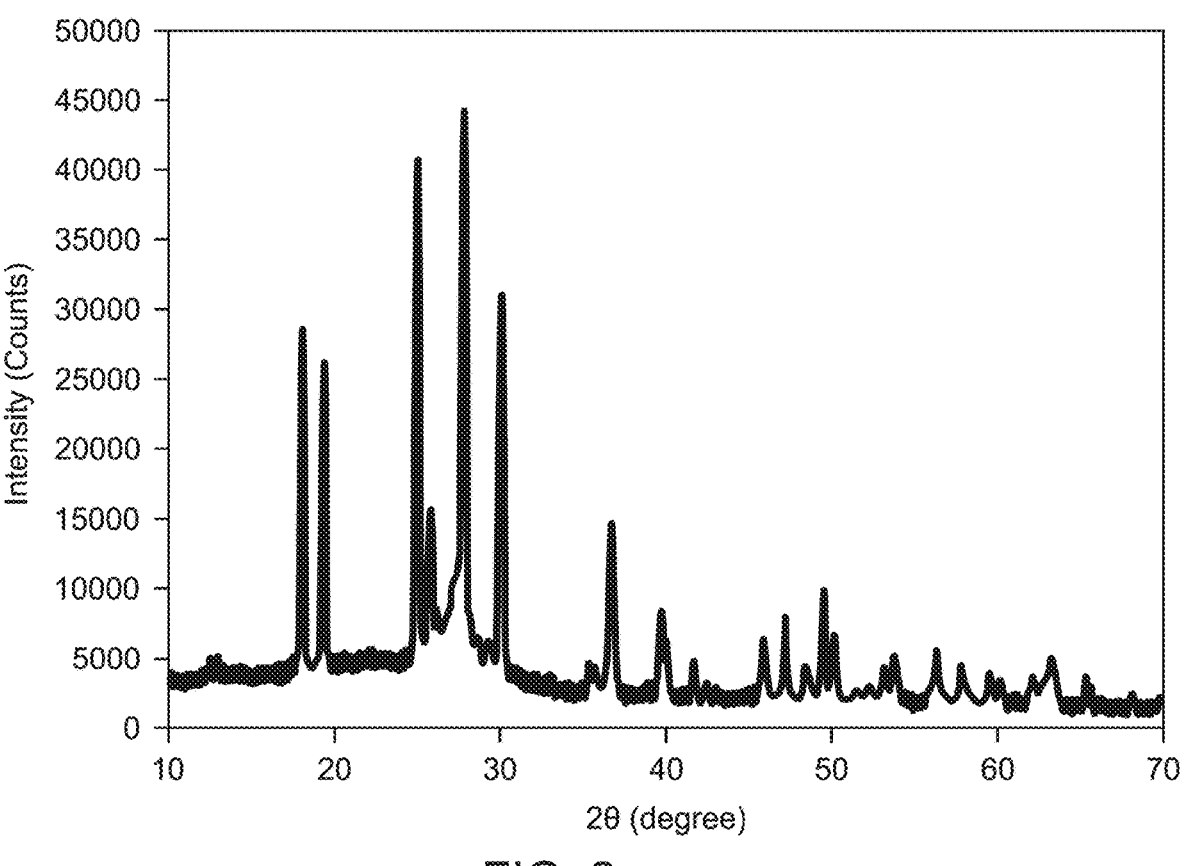
FIG. 2 is a graph depicting X-ray diffraction (XRD) diffractogram of the $CaV_2O_6/CaSiO_3/g$-$C_3N_4$ nanocomposite, according to certain embodiments.

The crystallinity and phases identification present in $CaV_2O_6/CaSiO_3/g-C_3N_4$ nanocomposite was analyzed by X-ray diffraction (XRD) and the results are shown in FIG. 2. The intense peaks and high intensity values indicate that the powder is highly crystalline in nature. Examination of the diffraction patterns with the standard PDF cards reveals the presence of $CaV_2O_6$ as major phase together with $CaSiO_3$ and g-C₃N₄ as minor phases. The $CaV_2O_6$ phase was indexed to the 2θ values of 25.1°, 25.9°, 27.8°, 27.9°, 30.1°, 36.8°, 36.9°, 39.7° and 49.6°. These diffractions were assigned to (201), (100), (−202), (−111), (111), (−311), (400), (003) and (020) planes of the monoclinic phase of $CaV_2O_6$ (Reference code No. 01-073-0186). The $CaSiO_3$ phase (COD No. 01-072-2284) was detected at 2θ values of 25.2°, 30.2° and 41.8° which corresponds to (002), (120), and (−231) planes respectively. The diffractions related to g-C₃N₄ was observed at 45.8°, 53.7°, 71.8° and 79.4° C. (COD No. 1534042). Minor traces of $SiO_2$ were also detected at 2θ value of 19.3° and 25.1° (Reference code No. 00-049-0629). No other phases were detected in the spectra indicating the successful fabrication of the nanocomposite.

Figure 3A:
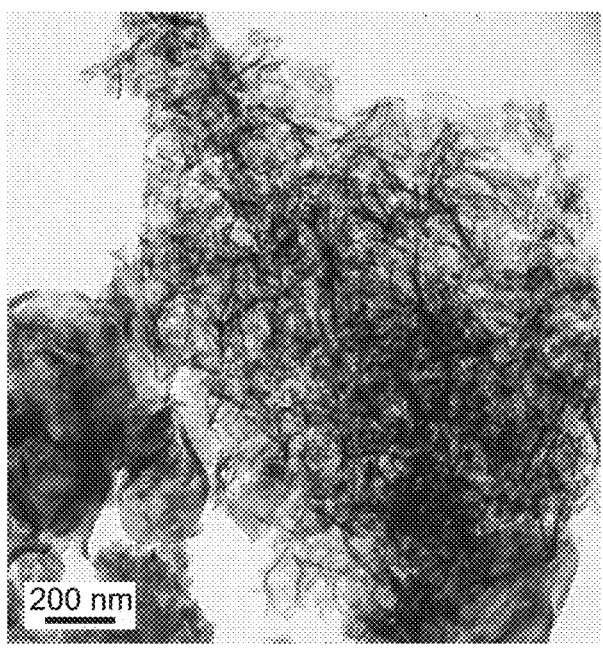
FIG. 3A shows a transmission electron microscope (TEM) image of the $CaV_2O_6/CaSiO_3/g$-$C_3N_4$ nanocomposite at 200 nanometers (nm), according to certain embodiments.
Figure 3B:
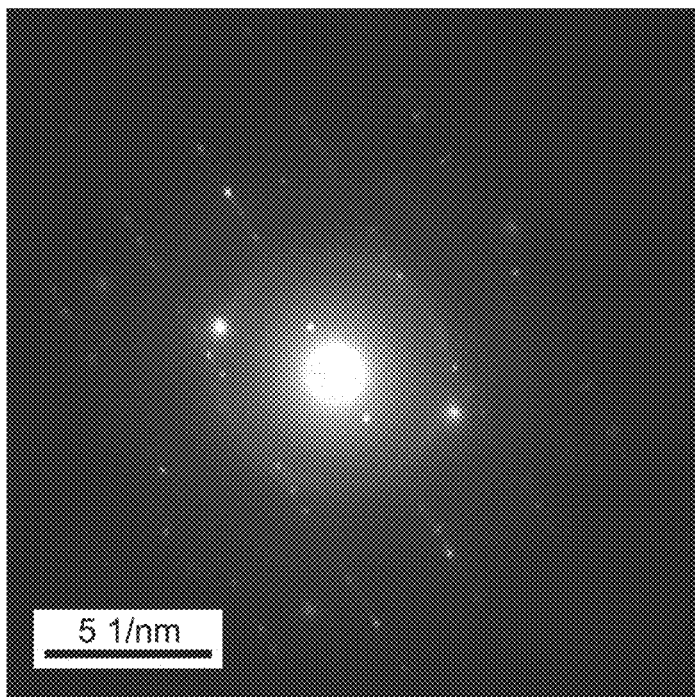
FIG. 3B shows a selected area electron diffraction pattern for the $CaV_2O_6/CaSiO_3/g$-$C_3N_4$ nanocomposite, according to certain embodiments.

Transmission electron microscopy (TEM) images of the $CaV_2O_6/CaSiO_3/g-C_3N_4$ nanocomposite are shown in FIG. 3. FIG. 3A showed a two-dimensional porous structure constructed with curled and wrinkled nanosheets and platelets of the g-C₃N₄ along with well dispersed homogeneous nanowires of metal oxides with average length 90.6 nanometer (nm) present on nanosheets of g-C₃N₄. The corresponding selected area electron diffraction (SAED) pattern shown in FIG. 3B reveals diffraction spots with interplanar spacing of 0.23 nm, 0.219 nm, 0.17 and 0.146 nm due to (003, $CaV_2O_6$, (−231, $CaSiO_3$) and (003, $CaV_2O_6$), diffraction planes, respectively as confirmed from XRD data.

Figure 4A:
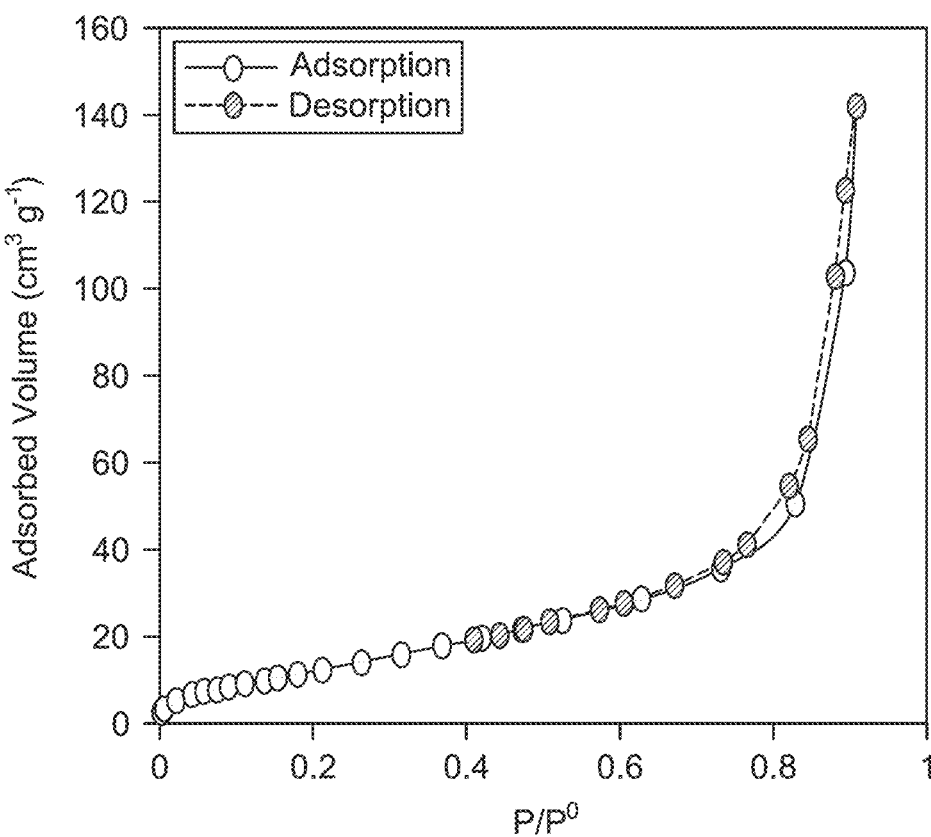
FIG. 4A is a graph depicting nitrogen ($N_2$) adsorption-desorption isotherms of the $CaV_2O_6/CaSiO_3/g$-$C_3N_4$ nanocomposite, according to certain embodiments.
Figure 4B:
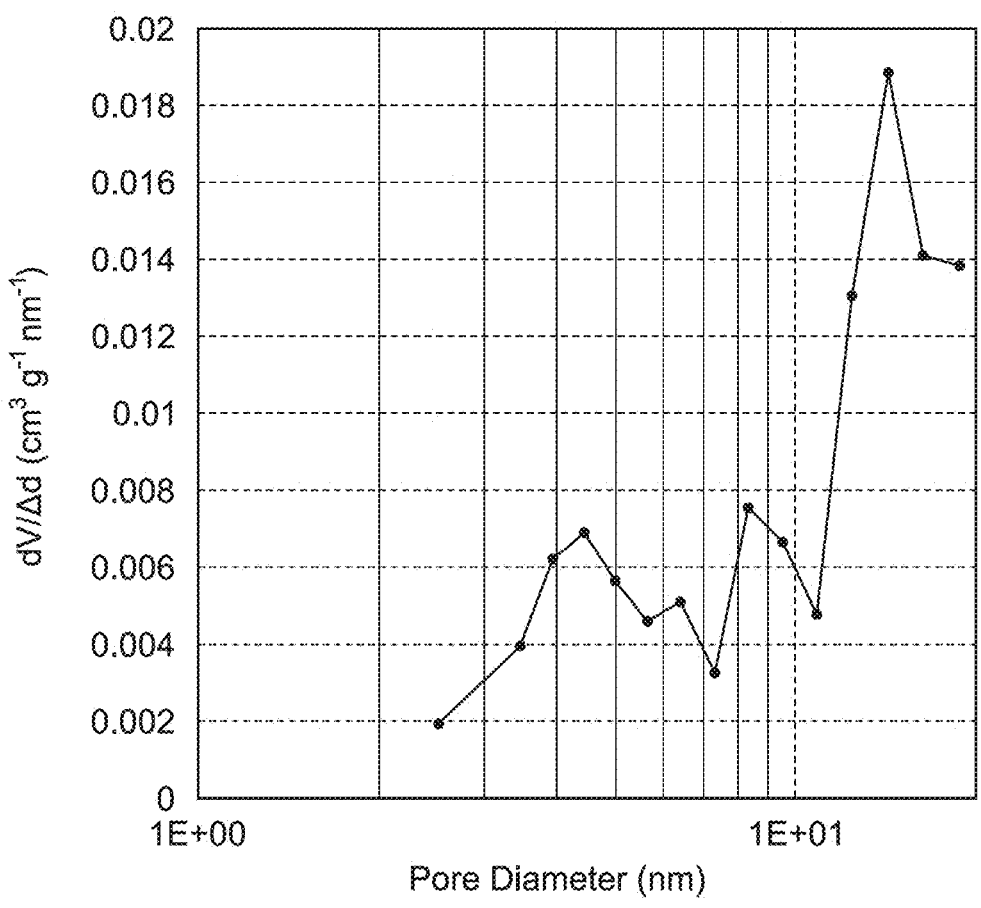
FIG. 4B is a graph depicting pore size distribution curve of the $CaV_2O_6/CaSiO_3/g$-$C_3N_4$ nanocomposite, according to certain embodiments.

FIG. 4 displays the nitrogen adsorption-desorption isotherms of the $CaV_2O_6/CaSiO_3/g-C_3N_4$ nanocomposite. The nitrogen sorption isotherm of the nanocomposite belongs to type IV isotherm with narrow hysteresis loop, indicating the formation of mesoporous structures (FIG. 4A). However, shifting the loop to a relatively higher pressure ($P/P_0=0.73-1$) indicates the presence of wide mesopores, which may result from the deposition of metal oxides particles in the wide pores of g-C₃N₄. Furthermore, the Brunauer-Emmett-Teller (BET) surface area of the nanocomposite was calculated to be 57.02 square meters per gram $(m^2\ g^{-1})$. The marked high specific surface area reflects the good dispersion of these metal oxides nanoparticles on g-C₃N₄. and $CaSiO_3$. Moreover, the pore size distribution curves, plotted using the Barrett-Joyner-Halenda (BJH) method shown in FIG. 4B exhibited trimodal distribution with average pore diameters maximized at 4.3 nm, 8.5 nm and 14.27 nm and pore volume of 0.22 cubic centimeters per gram ($cm^3$ $g^{-1}$). All the isotherms belong to the category H3 type of pores, which do not exhibit limiting adsorption at high $P/P_0$ and arise due to aggregation of plate-like particles giving rise to slit-shaped pores. This indicates that the assembly of the nanocomposite provoked a mesoporous array.

Numerous modifications and variations of the present disclosure are possible in light of the above teachings. It is therefore to be understood that within the scope of the appended claims, the invention may be practiced otherwise than as specifically described herein.

The invention claimed is:

1. A porous $CaV_2O_6/CaSiO_3/g\text{-}C_3N_4$ nanocomposite, comprising:
   calcium metavanadate ($CaV_2O_6$);
   calcium silicate ($CaSiO_3$); and
   graphitic carbon nitride ($g\text{-}C_3N_4$), wherein
   the $CaV_2O_6$, the $CaSiO_3$ and the $g\text{-}C_3N_4$ are present in a mass ratio of 0.8-1.2:0.8-1.2:0.8-1.2;
   the $CaV_2O_6$ and $CaSiO_3$ are a homogeneous mixture in the form of nanowires;
   the $g\text{-}C_3N_4$ is in the form of nanosheets; and
   the nanowires are homogeneously distributed between the nanosheets.

2. The nanocomposite of claim 1, wherein the $g\text{-}C_3N_4$ nanosheet has an interplanar spacing of 0.1 to 0.25 nanometer (nm).

3. The nanocomposite of claim 1, wherein the $CaV_2O_6/CaSiO_3$ nanowires have an average length of 80 to 100 nm.

4. The nanocomposite of claim 1, wherein the $CaV_2O_6/CaSiO_3/g\text{-}C_3N_4$ nanocomposite is in the form of particles having a Brunauer-Emmett-Teller (BET) surface area of 50 to 65 square meters per gram ($m^2g^{-1}$).

5. The nanocomposite of claim 1, wherein the $CaV_2O_6/CaSiO_3/g\text{-}C_3N_4$ nanocomposite is in the form of particles having an average pore diameter of 2 to 20 nm.

6. The nanocomposite of claim 1, wherein the $CaV_2O_6/CaSiO_3/g\text{-}C_3N_4$ nanocomposite is in the form of particles having an average pore volume of 0.1 to 0.3 cubic centimeters per gram ($cm^3g^{-1}$).

7. The nanocomposite of claim 1, wherein the $CaV_2O_6/CaSiO_3/g\text{-}C_3N_4$ nanocomposite is in the form of particles having a pore size distribution of 0.001 to 0.02 cubic centimeters per gram per nanometer ($cm^3g^{-1}$ $nm^{-1}$).

8. A method to synthesize the $CaV_2O_6/CaSiO_3/g\text{-}C_3N_4$ nanocomposite of claim 1, comprising:
   heating a calcium salt and a silicate salt in an alcohol and water solution to form a silicate product;

heating urea to a temperature of 550 to 650 degrees Celsius (° C.) for 30 to 60 minutes (min) to form a $g\text{-}C_3N_4$ product;
   heating a vanadium compound and a biomass with water and an acid to form a vanadium product;
   mixing the silicate product, the $g\text{-}C_3N_4$ product, and the vanadium product in an ethylene glycol monomethyl ether to form a mixture; and
   microwaving the mixture to form the $CaV_2O_6/CaSiO_3/g\text{-}C_3N_4$ nanocomposite.

9. The method of claim 8, wherein the calcium salt is at least one selected from the group consisting of calcium nitrate, calcium phosphate, calcium sulfate, calcium chloride, calcium acetate, and calcium carbonate.

10. The method of claim 8, wherein the silicate salt is at least one selected from the group consisting of sodium metasilicate, potassium metasilicate, and magnesium metasilicate.

11. The method of claim 8, wherein the alcohol is at least one selected from the group consisting of methanol, ethanol, propanol, and butanol.

12. The method of claim 8, wherein the vanadium compound is at least one selected from the group consisting of ammonium metavanadate, sodium metavanadate, silver metavanadate, manganese metavanadate, vanadium (II) oxide, vanadium (III) oxide, vanadium (IV) oxide and vanadium (V) oxide.

13. The method of claim 8, wherein the biomass is at least one selected from the group consisting of xylose, glucose, fructose, galactose, arabinose, ribose, lyxose, cellulose, hemicellulose and lignin.

14. The method of claim 8, wherein the acid is at least one selected from the group consisting of nitric acid, hydrochloric acid, sulfuric acid, acetic acid, and phosphoric acid.

15. The method of claim 8, wherein the silicate product is heating to a temperature of 160 to 200° C. for 1 to 3 hours (h).

16. The method of claim 8, wherein the vanadium product is heated to a temperature of 110 to 130° C. for 4 to 6 h.

17. The method of claim 8, wherein the mixture is microwaved at a temperature of 160 to 200° C. at a pressure of 4 to 6 bar for 30 to 90 min.

18. The method of claim 8, further comprising:
   calcining the vanadium product at a temperature of 500 to 600° C. for 2 to 4 h before mixing.

19. The nanocomposite of claim 1, wherein the $CaV_2O_6/CaSiO_3/g\text{-}C_3N_4$ nanocomposite has a slit-shaped pore.

20. The nanocomposite of claim 1, wherein the $CaV_2O_6/CaSiO_3/g\text{-}C_3N_4$ nanocomposite has an average pore diameter maximized at 4.3, 8.5, and 14.27 nm.

* * * * *